United States Patent [19]

Essi et al.

[11] Patent Number: 5,318,480
[45] Date of Patent: Jun. 7, 1994

[54] CONSTANT VELOCITY JOINT BOOT RETAINER

[75] Inventors: Michael P. Essi, Toledo; Christopher C. Cheney, Maumee, both of Ohio

[73] Assignee: Dana Corporation, Toledo, Ohio

[21] Appl. No.: 999,458

[22] Filed: Dec. 29, 1992

Related U.S. Application Data

[63] Continuation of Ser. No. 718,995, Jun. 21, 1991, abandoned.

[51] Int. Cl.⁵ .............................................. F16D 3/84
[52] U.S. Cl. ................................. 464/175; 277/212 FB
[58] Field of Search ............... 464/133, 173, 175, 905, 464/906; 277/212 FB; 403/50, 51; 411/101, 531, 546

[56] References Cited

U.S. PATENT DOCUMENTS

| | | | |
|---|---|---|---|
| 1,216,508 | 2/1917 | Spade | 464/175 X |
| 1,847,677 | 3/1932 | Sternberg | |
| 2,510,362 | 6/1950 | Anderson | 464/175 |
| 2,579,356 | 12/1951 | Anderson | 464/906 X |
| 3,106,077 | 10/1963 | Sharp | 464/906 X |
| 3,488,979 | 1/1970 | Croset | 464/906 X |
| 4,000,629 | 1/1977 | Bellomo | |
| 4,004,435 | 1/1977 | Rubin | 464/175 |
| 4,392,838 | 7/1983 | Welschof et al. | 464/175 |
| 4,493,676 | 1/1985 | Krude | 464/141 |
| 4,747,805 | 5/1988 | Welschof et al. | 464/175 |
| 4,819,919 | 4/1989 | Taylor | 403/51 X |

*Primary Examiner*—Daniel P. Stodola
*Attorney, Agent, or Firm*—John H. Crozier; Robert M. Leonardi

[57] ABSTRACT

A structure for securing a flexible boot to a face of the outer race of a constant velocity joint which includes providing the boot with a generally annular flat flange portion having a uniform thickness and a plurality of apertures formed therethrough. A securing structure includes a generally annular retaining ring having a corresponding plurality of apertures formed therethrough, with an axially extending collar portion formed about each of the apertures. The axial lengths of the collar portions are approximately 80 percent of the thickness of the boot flange. The boot is secured to the face of the outer race by disposing the retaining ring thereabout such that the collar portions extend through the boot flange apertures. Respective threaded fasteners are inserted through the retaining ring and boot flange apertures into axially extending bores formed in the outer race, which fasteners may be the way by which the joint is mounted. When tightened, the bolts cause the retaining ring to compress the boot flange to provide a seal between it and the outer race. However, because the collar portions engage the face of the outer race, the retaining ring can compress the boot flange to only approximately 80 percent of its original thickness, thus preventing the boot flange from being crushed if the threaded fasteners are over-tightened. In a further embodiment, there is provided a shell integral with the retaining ring to prevent ballooning of the boot at high rotational speeds.

9 Claims, 7 Drawing Sheets

CONSTANT VELOCITY JOINT BOOT RETAINER

This is a continuation of co-pending application Ser. No. 07/718,995 filed on Jun. 21, 1991, now abandoned.

BACKGROUND OF THE INVENTION

1. Field of the Invention

The present invention relates to constant velocity joints generally and, more particularly, to a novel boot retainer for such joints which provides excellent sealing and which permits greater operating angles than are achievable with conventional boot retainers.

2. Background Art

Constant velocity joints are well known devices for transmitting rotational motion uniformly from a driving member to a driven member, the two members having axes of rotation in angular relation therebetween. Typically, the driving member as a shaft extending from an engine or a transmission and the driven member is a wheel or a shaft extending to a machine or wheel being driven by the engine.

Such joints are widely used in front wheel drive vehicles. In this application, there is a need to transmit rotary motion from the transmission to the front wheels, both the transmission and front wheels remaining in relatively fixed vertical planes, but being relatively vertically displaceable from one another. Since the distance between the transmission and the front wheels is short, the shaft extending therebetween can assume rather sharp angles upward and downward when the vehicle is moving, compared to a resting position when the vehicle is not moving. To accommodate this relative motion, constant velocity joints are provided at either end of the shaft to accommodate the angular displacement and also to accommodate horizontal (slip) displacement.

Because of the high degree of motion between moving parts within a constant velocity joint, it is necessary that it be well lubricated and that dirt and dust be excluded therefrom. In order to accomplish these objectives, a resilient boot is provided to seal the joint. The boot is almost always secured to a cylindrical shaft member by means of a tightened metal band. In some cases, the boot is secured to the joint also by means of a metal band tightened about a suitable cylindrical surface, which may comprise a metal stamping extending from the housing of the constant velocity joint. In other cases, the boot is secured to the joint by an annular retaining ring having a plurality of apertures formed therethrough, which ring mates with a flat annular flange formed on the end of the boot orthogonal to the major axis thereof. The flange has a corresponding plurality of apertures formed therethrough and a plurality of fasteners extends through the apertures of the retaining ring and the flange into the housing of the constant velocity joint.

Such conventional means of securing constant velocity joint boots have a number of disadvantages, among which is that operating angles are limited at various slip positions. A further disadvantage of some conventional means is that there is resilient material (a portion of the boot) disposed between the clamping member and the member to which the boot is being secured. The latter arrangement can lead to the boot material disposed between the metal surfaces being overcompressed which can shorten the life of the boot. In the case of a clamping surface comprising a metal stamping extending from the constant velocity joint, extreme operating angles may cause the shaft to strike the end of the stamping. Also, the latter arrangement relies on a relatively ineffective metal-to-metal seal to retain lubricant.

Some conventional constant velocity joint boots intended for high speeds are surrounded by cylindrical shells which are provided to prevent the boots from ballooning outward at high speeds. Typically, the boots are bonded, crimped, or otherwise attached to the inside surface of these shells. The latter arrangement is disadvantageous in that such attachment limits the operating axial motion and operating angle of the boot.

Accordingly, it is a principal object of the present invention to provide retaining means for securing constant velocity joint boots that permits greater operating angles than can be achieved with conventional retaining means.

A further object of the invention is to provide such retaining means that prevents overcompression of the boot material when the boot is secured to the joint.

An additional object of the invention is to provide such retaining means that includes, as an integral part thereof, a shell to prevent ballooning of the boot, which shell is unattached to the boot to permit greater operating angles and free axial movement of the boot.

Another object of the invention is to provide such retaining means and a boot that can be easily retrofitted to existing constant velocity joints.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a structure for securing a flexible boot to a face of the outer race of a constant velocity joint which includes providing the boot with a generally annular flat flange portion having a uniform thickness and a plurality of apertures formed therethrough. A securing structure includes a generally annular retaining ring having a corresponding plurality of apertures formed therethrough, with an axially extending collar portion formed about each of the apertures. The axial lengths of the collar portions are approximately 80 percent of the thickness of the boot flange. The boot is secured to the face of the outer race by disposing the retaining ring thereabout such that the collar portions extend through the boot flange apertures. Respective threaded fasteners are inserted through the retaining ring and boot flange apertures into axially extending bores formed in the outer race, which fasteners may be the means by which the joint is mounted. When tightened, the bolts cause the retaining ring to compress the boot flange to provide a seal between it and the outer race. However, because the collar portions engage the face of the outer race, the retaining ring can compress the boot flange to only approximately 80 percent of its original thickness, thus preventing the boot flange from being crushed if the threaded fasteners are over-tightened. In a further embodiment, there is provided a shell integral with the retaining ring to prevent ballooning of the boot at high rotational speeds.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Referring now to the Drawing, in which the same or similar elements are given consistent identifying numerals throughout the various figures thereof, there is illustrated a constant velocity joint 10. Constant velocity joint 10 is of any conventional construction and, consequently, the elements and operation thereof will not be described here. It will be understood that constant velocity joint 10 may be fixedly attached, for example, at a first vertical face 12 to a wheel or a shaft with which it rotates.

Extending from constant velocity joint 10 through a second vertical face 14 is a shaft 16 which may be either a driven or driving member depending on the application. It will be understood that, although shaft 16 is shown with its major axis orthogonal to the vertical plane of constant velocity joint 10, the purpose of the joint is to permit the distal end of the shaft to be able to move away from the position shown so that the axis of the shaft can form an acute angle with the vertical axis of the constant velocity joint.

Extending between shaft 16 and the second face 14 is a resilient boot, generally indicated by the reference numeral 20, which is fixedly attached to shaft 16 by means of a conventional metal band 24 tightened about a thickened cylindrical portion 28 of the boot formed at a first end of the boot. Boot 20 is given a high degree of flexibility by means of a plurality of convolutions, such as convolution 32, formed therein.

Figure 4:
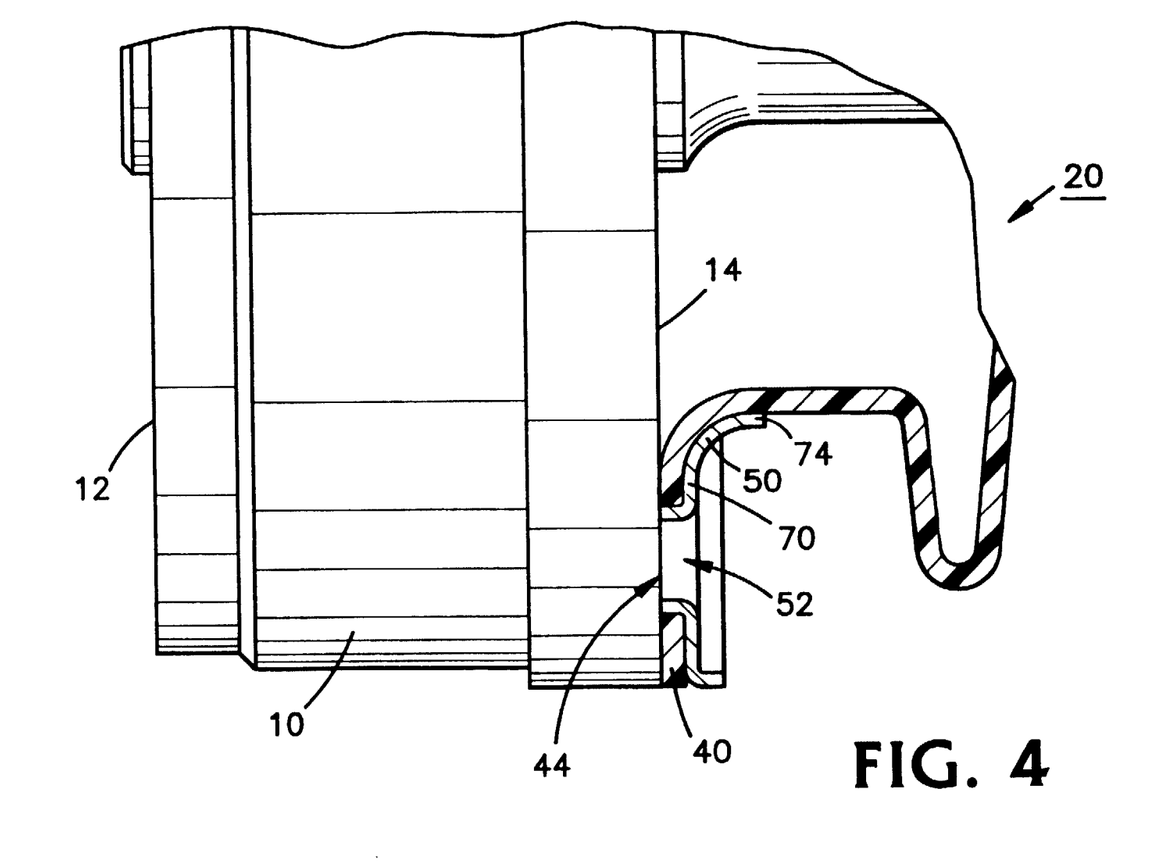
FIG. 4 is a fragmentary, enlarged portion of FIG. 1.

Referring now particularly to FIG. 4, at the second end of boot 20, there is formed a generally flat, annular flange portion 40 having defined therethrough a plurality of apertures, such as aperture 44. Flange portion 40 bears against second face 14 and is securely held thereagainst by an annular retaining ring 50, formed of metal or other suitable hard material, having defined therethrough a plurality of apertures, such as aperture 52 corresponding to aperture 44 of flange portion 40. Retaining ring 50 may be fixedly attached to constant velocity joint 10 by means of a plurality of threaded fasteners, such as fastener 60 (FIG. 1) passing through a bore 62 formed in the joint and into a threaded opening in a driving or driven member (not shown). Thus, 60 may be the fastener used to ordinarily attach constant velocity joint to the driving or driven member. Alternatively, bore 62 may be threaded, in which case, fastener 60 will engage that threaded bore and not pass into another member. It will be understood that each aperture 52 has a corresponding aperture 44 and that each pair of corresponding apertures has a corresponding fastener 60 engaging a threaded bore 62.

It will be understood that the present invention retains lubricant in constant velocity joint 10 by means of a seal between the resilient material of flange portion 40 of boot 20 and the metal surface of second face 14.

Figure 2:
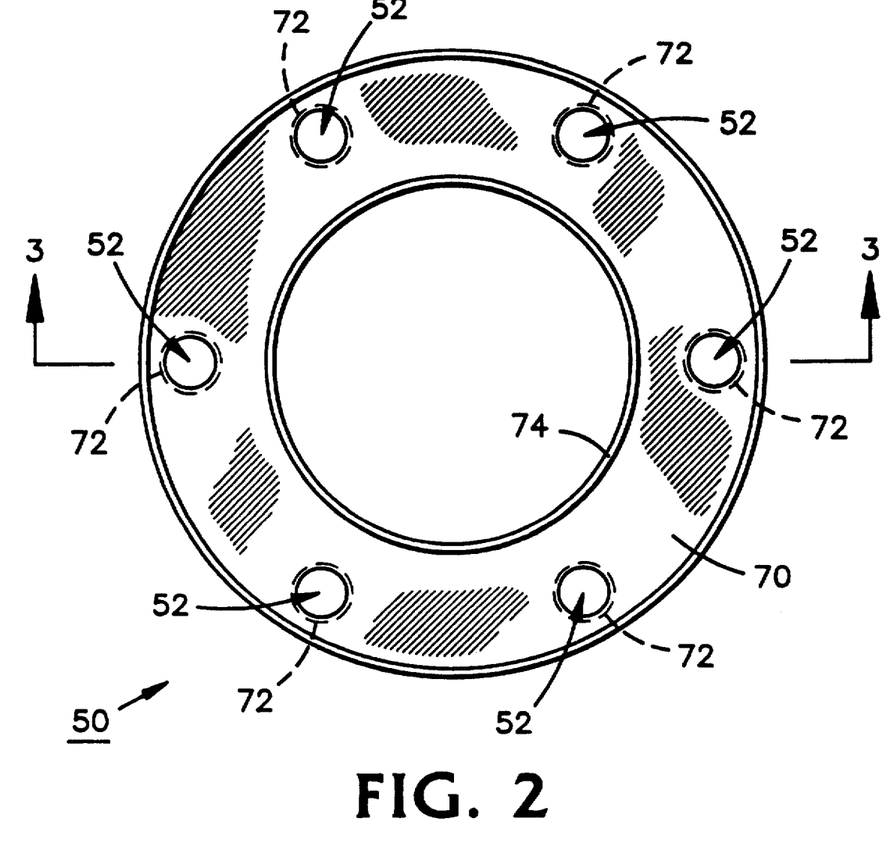
FIG. 2 is a top plan view of the retaining ring of the retaining means of FIG. 1.
Figure 3:
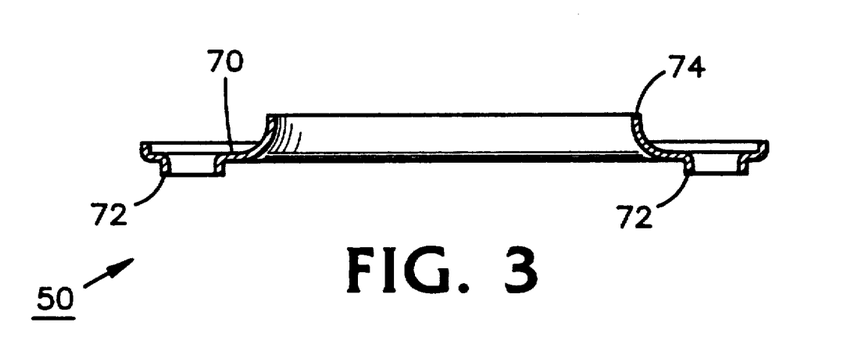
FIG. 3 is a side elevational view, in cross-section, taken along line "3—3" of FIG. 2.

Continuing to refer primarily to FIG. 4, but also to FIGS. 2 and 3, retaining ring 50 includes a generally flat annular portion 70 parallel to second face 14 of constant velocity joint 10, a collar portion 72 extending from the flat annular portion to the second face, and an outwardly flared inner portion 74 extending away from the second face and partially supporting boot 16 as it extends from the second face, so that the boot does not have to flex about a sharp corner.

Figure 10:
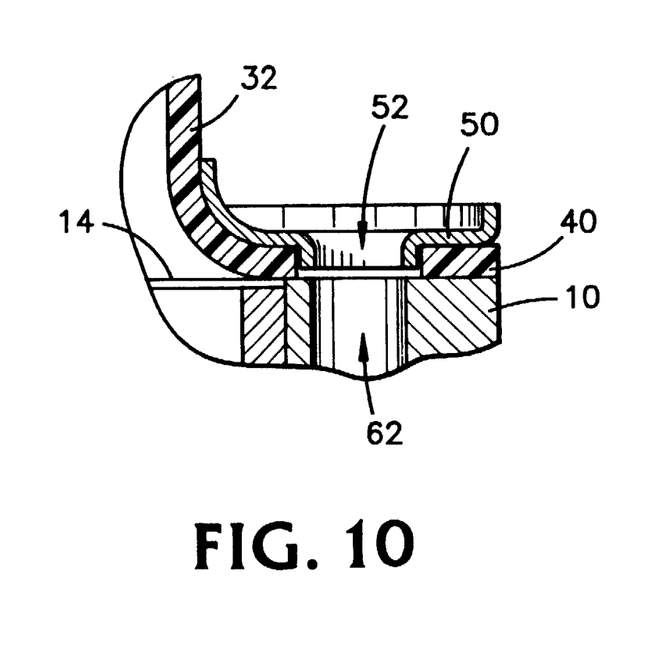
FIGS. 10 and 11 are details of a portion of the constant velocity joint boot retaining means of FIG. 1.
Figure 11:
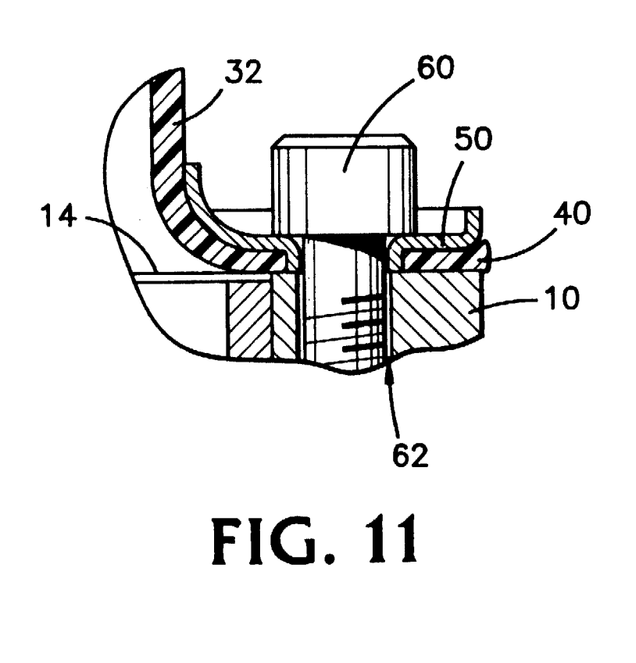

Collar portion 72 preferably has a height that is on the order of about 80 percent of the uncompressed thickness of flange portion 40 of boot 16 so that the amount of compression of the flange portion is controlled. as is indicated in FIGS. 10 and 11. FIG. 10 shows flange portion 40 uncompressed and FIG. 11 shows the flange portion compressed to about 80 percent of its uncompressed height. This arrangement permits a solid metal-to-metal contact between retaining ring 50 and second face 14, while preventing overcompression of flange portion 40. Thus, threaded fasteners 62 can be torqued to a high level to assure tightness, yet flange portion 40 will be compressed only a predetermined, controlled amount.

It is within the intent of the present invention that collar portion 72 may comprise a separate element or that it may comprise a shoulder formed on fastener 60.

Figure 1:
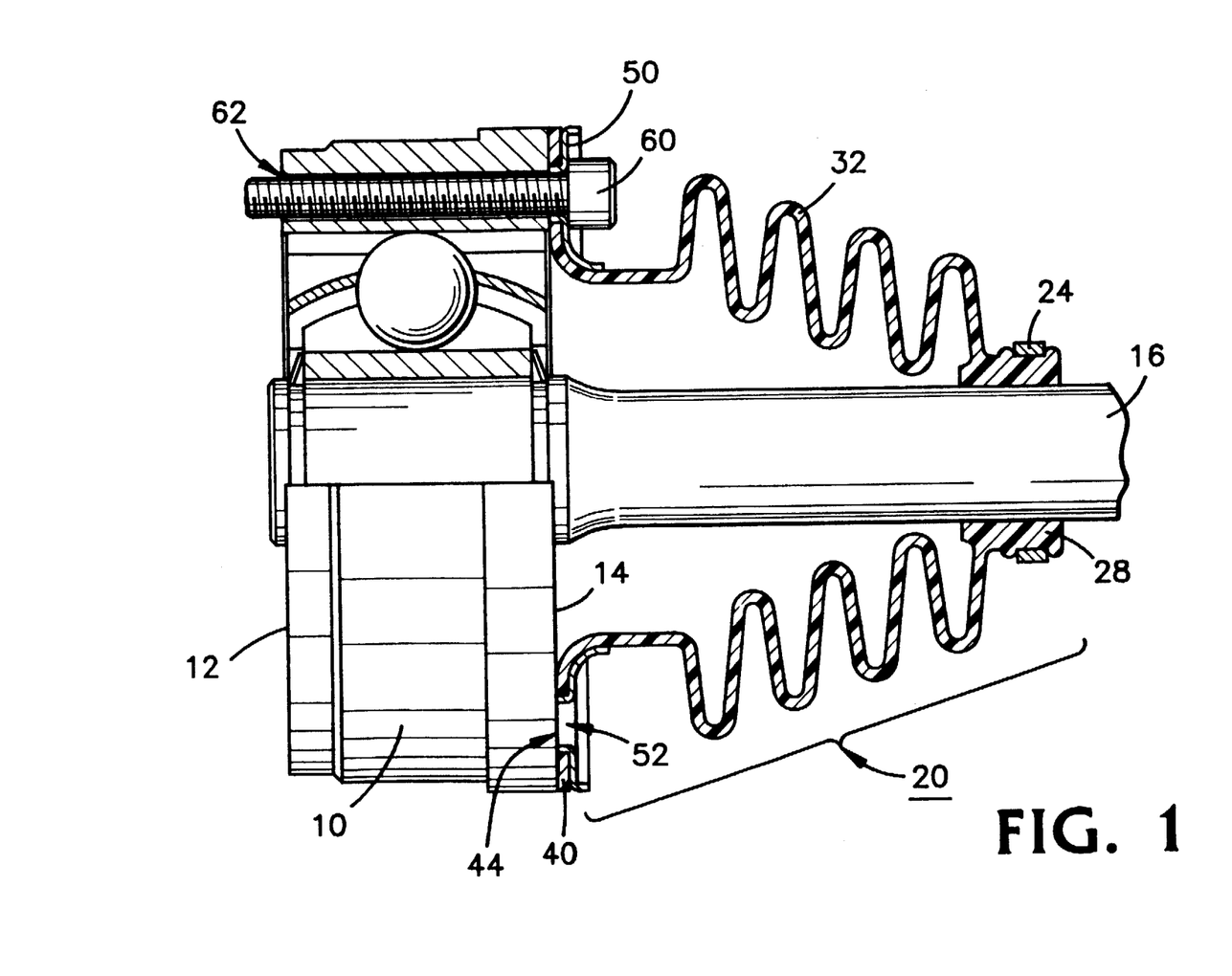
FIG. 1 is a side elevational view, partially cutaway and partially in cross-section, of constant velocity joint boot retaining means according to the present invention.

The use of fasteners 60 to attach boot 20 and retaining ring 50 means that the boot and retaining ring can be easily retrofitted to almost any existing constant velocity joint by removing and discarding an existing boot and its retaining means and installing boot 20 with retaining ring 50 as shown on FIG. 1.

Figure 5:
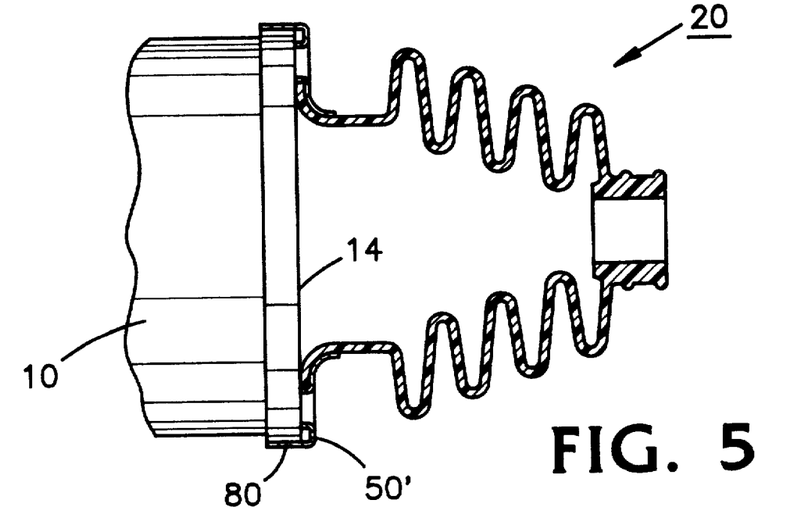
FIG. 5 is a side elevational view, partially in cross-section, of one alternative embodiment of the retaining means of FIG. 1.

FIG. 5 illustrates an alternative embodiment of retaining ring 50. Here, retaining ring 50' has a cylindrical extension formed at its outer periphery to engage the cylindrical surface of the outer race of constant velocity joint 10 at second face 14 in order to provide greater rigidity of the retaining ring.

Figure 6:
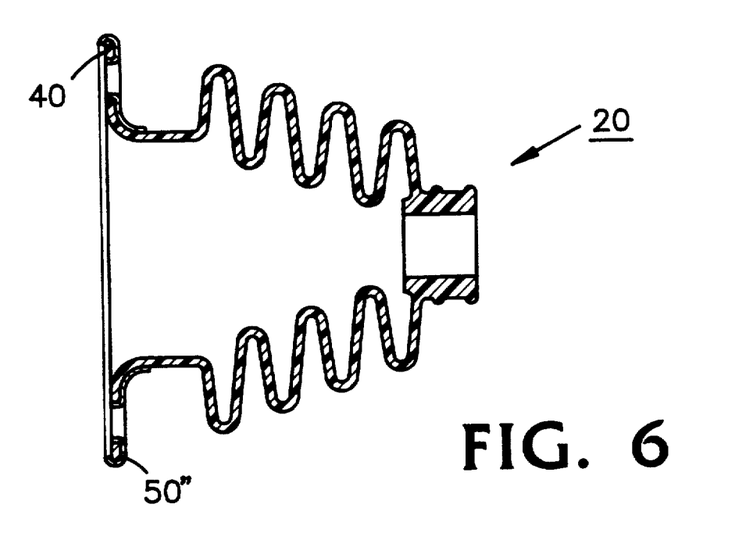
FIG. 6 is a side elevational view, in cross-section, of another alternative embodiment of the retaining means of FIG. 1.

FIG. 6 illustrates another alternative embodiment of retaining ring 50. Here, retaining ring 50' has a cylindrical extension formed at its outer periphery and crimped around the outer periphery of flange 40 of boot 20 so that the retaining ring and boot can be furnished as a complete assembly.

Figure 7:
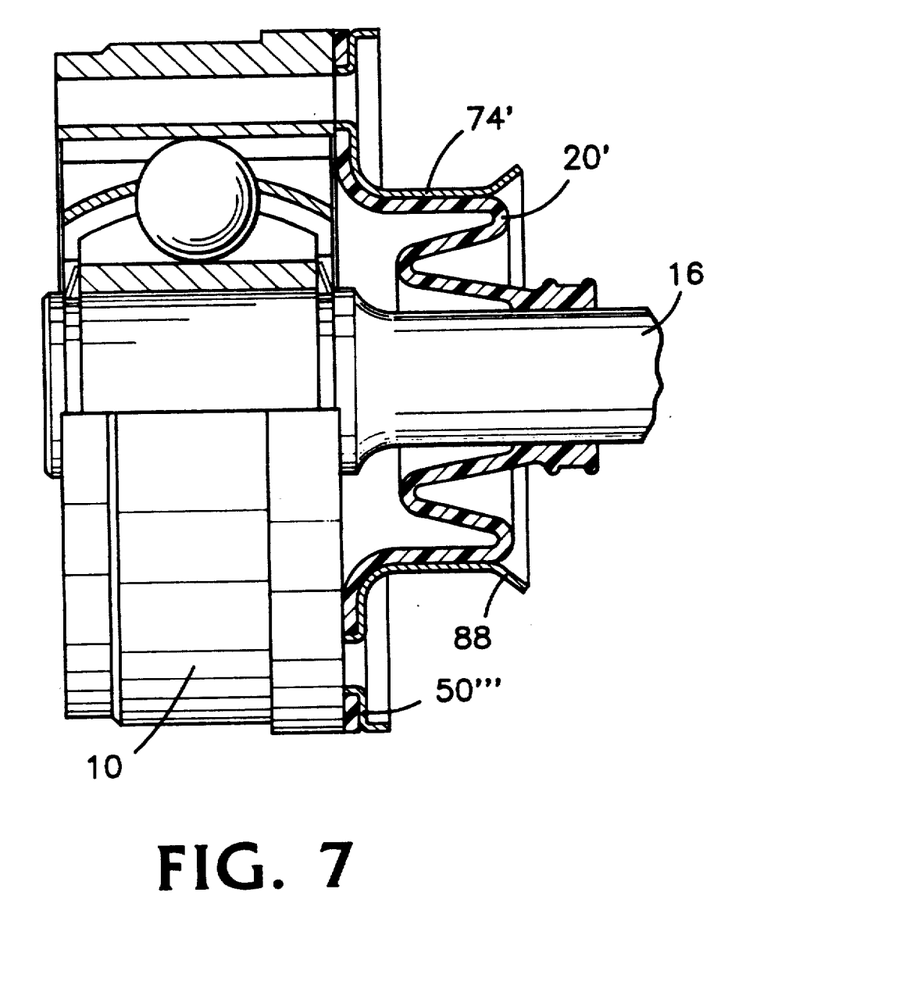
FIG. 7 is a side elevational view, partially cutaway and partially in cross-section, of constant velocity joint boot retaining means with an anti-ballooning shell as an integral part thereof.
Figure 8:
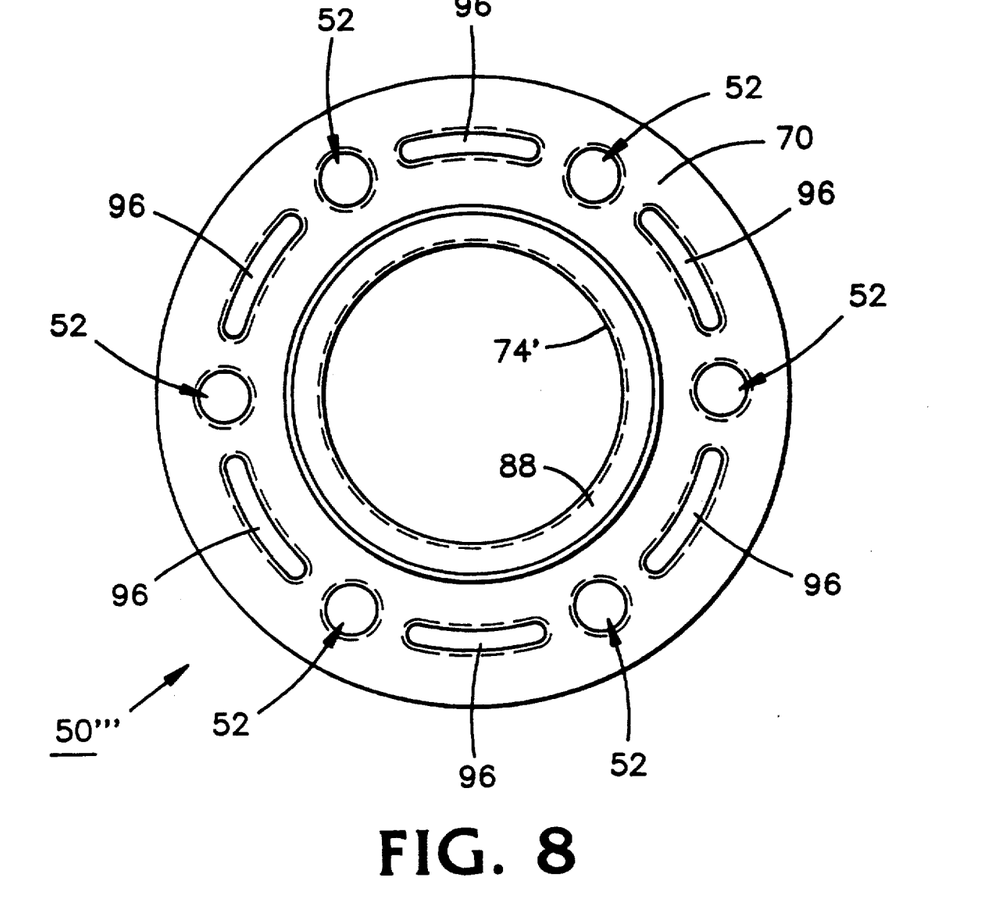
FIG. 8 is a top plan view of the retaining means of FIG. 7.
Figure 9:
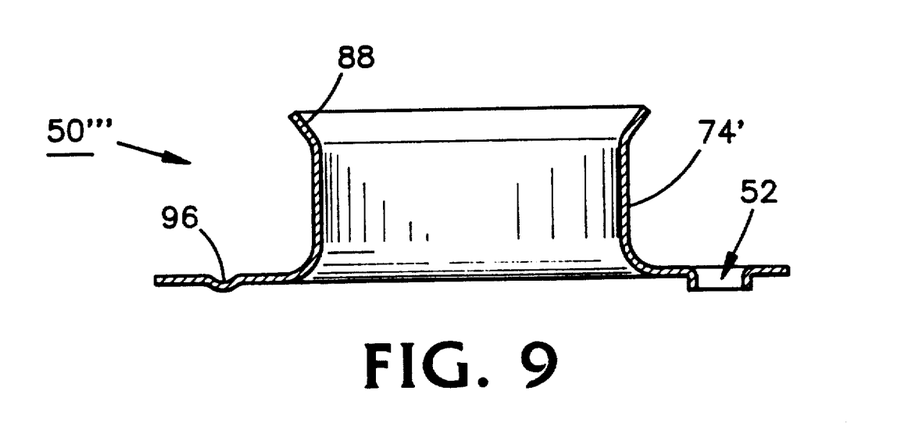
FIG. 9 is a side elevational view in cross-section of the retaining means of FIG. 7.

FIGS. 7-9 illustrate a constant velocity boot retaining ring 50''' having generally the same features as retaining ring 50 described above, except that the inner outwardly flared portion 74 of retaining ring 50 has been extended to form an anti-ballooning shell 74' on retaining ring 50''' to surround high velocity boot 20' (FIG. 7 only). Anti-ballooning shell 74' has a flared bell end 88 to permit greater operating angles for shaft 16. Since boot 20' is unattached to shell 74', it is free to move axially which contributes to the ability of shaft 16 to assume greater operating angles.

FIGS. 8 and 9 illustrate means which can be included in retaining ring 50''' to provide additional rigidity thereof and which can be included, as well, if desired, in retaining ring 50 described above. Here, a plurality of elongate, arcuate troughs 96 are provided in flat annular portion 70 of retaining ring 50''' formed along the circle defined by the centers of openings 52. The depth of troughs 96 may exceed 20 percent of the thickness of flange 40 (FIG. 4) in order to closely approach face 14 of constant velocity joint 10; however, this is not deemed to be disadvantageous, since the resulting over-compression of the flange material is not occurring at an opening therethrough.

Retaining rings 50, 50', 50'', and 50''' may be constructed of metal by any conventional forming means. Likewise, constant velocity joint boots 20 and 20' may be formed of any suitable material by conventional means known in the art.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An apparatus for transferring rotational motion, said apparatus comprising:
   (a) a constant velocity joint having a planar face at one end thereof;
   (b) a shaft having a proximal end extending from interiorly of said constant velocity joint through said face;
   (c) said constant velocity joint comprising means to permit transmission of said rotational motion between said constant velocity joint and said shaft, regardless of the relative radial position of a distal end of said shaft with respect to said constant velocity joint, without variation in the rate of said rotational motion;
   (d) a constant velocity joint boot having a generally flat annular flange formed at one end of said boot engaging said face of said constant velocity joint and having a plurality of apertures formed through said annular flange;
   (e) an annular retaining ring having a generally flat annular portion to bear against said annular flange;
   (f) a plurality of apertures formed through said annular portion of said retaining ring, said apertures corresponding to said apertures formed through said annular flange such that fastening means inserted through said apertures, through said face, and into said constant velocity joint will fasten said retaining ring to said constant velocity joint with said annular flange compressed therebetween;
   (g) said annular retaining ring including a plurality of annular collars, monolithic with said retaining ring, disposed about said annular portion, defining said plurality of apertures, and extending orthogonally from said annular portion and extending partially through said apertures formed through said annular flange when said annular flange is not compressed, through which said annular collars said fastening means extend, the distal end of said collars contacting said face of said constant velocity joint, when said annular flange is compressed, such as to limit the degree of compression of said annular flang between said retaining ring and said face; and
   (h) a plurality of stiffening means defined in said flat annular portion of said retaining ring between said apertures formed through said annular portion.

2. An apparatus, as defined in claim 1, wherein the length of said collars is about 80 percent of the uncompressed thickness of said flat annular flange of said boot such that, when said retaining ring is fastened to said face, said flat annular flange of said boot is compressed to about 80 percent of its uncompressed thickness.

3. An apparatus, as defined in claim 1, further comprising an inner flared portion formed at the inner periphery of said annular portion of said retaining ring extending axially outwardly away from said face, concentric with the major axis of said constant velocity joint boot, so as to engage a portion of an outer surface said boot.

4. An apparatus, as defined in claim 1, further comprising a cylindrical portion extending orthogonally from the outer periphery of said annular portion of said retaining ring to extend around and contactingly engage a cylindrical outer peripheral surface of said face so as to provide rigidity for said retaining ring.

5. An apparatus, as defined in claim 1, further comprising a cylindrical portion extending orthogonally from the outer periphery of said annular portion of said retaining ring and partially crimpable about said annular flange of said boot such that said retaining ring and said constant velocity boot can be furnished as an assembled unit, with said retaining ring partially crimped about said annular flange.

6. An apparatus, as defined in claim 1, further comprising a cylindrical portion extending axially orthogonally outwardly from the inner periphery of said annular portion of said retaining ring, concentric with the major axis of said constant velocity joint boot, and surrounding said constant velocity joint boot to prevent ballooning thereof at high rotational speeds thereof.

7. An apparatus, as defined in claim 6, wherein a distal end of said cylindrical portion has an outwardly flared bell shape to permit high operating angles of said constant velocity joint.

8. An apparatus, as defined in claim 1, wherein said plurality of stiffening means comprise arcuate troughs.

9. An apparatus, as defined in claim 8, wherein said plurality of arcuate troughs extend downwardly from said flat annular portion of said retaining ring.

* * * * *